United States Patent
Hill et al.

(10) Patent No.: US 7,173,619 B2
(45) Date of Patent: Feb. 6, 2007

(54) MATCHING DIGITAL INFORMATION FLOW TO A HUMAN PERCEPTION SYSTEM

(75) Inventors: William Hill, Carnation, WA (US); Gregory C. Hitchcock, Woodinville, WA (US); Kevin Larson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 10/886,879

(22) Filed: Jul. 8, 2004

(65) Prior Publication Data

US 2006/0007242 A1    Jan. 12, 2006

(51) Int. Cl.
*G06T 17/00* (2006.01)

(52) U.S. Cl. .................. 345/428; 345/1.1; 345/1.2; 345/1.3

(58) Field of Classification Search .................. None
See application file for complete search history.

(56) References Cited

U.S. PATENT DOCUMENTS

| | | | |
|---|---|---|---|
| 5,274,363 A | 12/1993 | Koved et al. | |
| 5,682,486 A | 10/1997 | Grossman et al. | |
| 5,715,384 A * | 2/1998 | Ohshima et al. | 345/428 |
| 5,920,315 A | 7/1999 | Santos-Gomez | |
| 5,923,307 A | 7/1999 | Hogle, IV | |
| 5,949,430 A | 9/1999 | Robertson et al. | |
| 6,018,340 A | 1/2000 | Butler et al. | |
| 6,044,178 A * | 3/2000 | Lin | 382/260 |
| 6,104,359 A | 8/2000 | Endres et al. | |
| 6,232,974 B1 | 5/2001 | Horvitz et al. | |
| 6,442,599 B1 * | 8/2002 | DuLac et al. | 709/217 |
| 6,549,218 B1 | 4/2003 | Gershony et al. | |
| 6,647,119 B1 * | 11/2003 | Slezak | 381/17 |
| 6,714,214 B1 | 3/2004 | DeMello et al. | |
| 6,714,215 B1 | 3/2004 | Flora et al. | |
| 6,985,158 B2 * | 1/2006 | Miller et al. | 345/598 |
| 2003/0025647 A1 * | 2/2003 | Cooper et al. | 345/1.1 |
| 2003/0115042 A1 | 6/2003 | Chen et al. | |
| 2004/0066407 A1 | 4/2004 | Regan et al. | |
| 2004/0066408 A1 | 4/2004 | Meyers et al. | |
| 2004/0066414 A1 | 4/2004 | Czerwinski et al. | |

OTHER PUBLICATIONS

Authors: Carolina Cruz-Neira, Daniel J. Sandin, Thomas A. DeFanti Title: "Surround-Screen Projection-Based Virtual Reality" Publisher: ACM Date: 1993 <http://portal.acm.org/citation/cfm?id=166134&coll=portal&dl=ACM&CFID=71647857&CFTOKEN=67031119>.*

(Continued)

*Primary Examiner*—Mark Zimmerman
*Assistant Examiner*—David Chu
(74) *Attorney, Agent, or Firm*—Amin & Turocy, LLP

(57) ABSTRACT

A method and system for matching digital information flow to the human perception system. In various embodiments, multi-monitor (multimon) support is leveraged to take advantage of multiple windowing and window positioning to separate elements of different tasks into information planes (which are based on a concept of "triage and focus"). Triage watches the flow of incoming information and determines the nature of the information. Based on the nature of the information and principles of human perception, Focus (or defocus) displays the information where the information is best viewed.

31 Claims, 9 Drawing Sheets

OTHER PUBLICATIONS

Authors: Luc Renambot, Hans J. W. Spoelder, Desmond Germans, Henri E. Bal, Frans C.A. Groen Title: "Man Multi-Agent Integration in VR. A Case Study with RoboCup" Associated instituion: Vrije University Date: 2000 <http://www.cs.vu.nl/~renambot/vr/html/talk.htm>.*

George Robertson, et al., Scalable Fabric: Flexible Task Management, AVI '04, May 25-28, 2004, pp. 85-89, ACM.

Hajime Nagahara, et al., Super Wide Viewer Using Catadioptrical Optics, VRST '03, 2003, 7 pages, ACM.

Dugald Ralph Hutchings, et al., Shrinking Window Operations for Expanding Display Space, AVI '04, May 25-28, 2004, pp. 350-353, ACM.

Dugald Ralph Hutchings, et al., Revisiting Display Space Management: Understanding Current Practice to Inform Next-generation Design, Proc. Graphics Interface 2004, May 17-19, 2004, pp. 127-134, Canadian Human-Computer Communications Society.

Jock D. Mackinlay, et al., Wideband Displays: Mitigating Multiple Monitor Seams, CHI 2004, Apr. 24-29, 2004, pp. 1521-1524, ACM.

Jonathan Grudin, Partitioning Digital Worlds: Focal and Peripheral Awareness in Multiple Monitor Use, SIGCHI '01, 2001, pp. 458-465, vol. 3 Issue 1, ACM.

Dugald Ralph Hutchings, et al., Display Space Usage and Window Management Operation Comparisons Between Single Monitor and Multiple Monitor Users, AVI '04, May 25-28, 2004, pp. 32-39, ACM.

Desney S. Tan, et al., WinCuts: Manipulating Arbitrary Window Regions for More Effective Use of Screen Space, CHI 2004, Apr. 24-29, 2004, pp. 1525-1528, ACM.

Eser Kandogan, et al., Elastic Windows: Improved Spatial Layout and Rapid Multiple Window Operations, AVI '96, 1996, pp. 29-38, ACM.

Hiroshi Ishii, et al., Tangible Bits: Towards Seamless Interfaces Between People, Bits, and Atoms, CHI 97, 1997, pp. 234-241, ACM.

George Robertson, et al., Immersion in Desktop Virtual Reality, UIST 97, 1997, pp. 11-19, ACM.

Amy Ashurst Gooch, et al., Evaluating Space Perception in NPR Immersive Environments, 2002, pp. 105-110, ACM.

Subrata Das, et al., COGENT: Cognitive Agent to Amplify Human Perception and Cognition, Agents 2000, 2000, pp. 443-450, ACM.

Yu-Fei Ma, et al., Contrast-based Image Attention Analysis by Using Fuzzy Growing, MM '03, 2003, pp. 374-381, ACM.

* cited by examiner

MATCHING DIGITAL INFORMATION FLOW TO A HUMAN PERCEPTION SYSTEM

TECHNICAL FIELD

This invention is related to human perception systems, and more specifically, to matching the flow of digital information to the human perception system.

BACKGROUND OF THE INVENTION

The way information is streamed from computer screens today does not match the way in which the human perception system is designed to handle information flow. Flow is poorly mapped to the human perception system. To use a "bus" analogy, humans have a 64-bit perception system, but the computer display is only 8 bits wide.

Computers began as tools and toys created by geeks, for geeks. There was no need for the vast majority of people to understand them, or even interact with them at all. Numbers or data were given to the data-processing department and you waited until you got a printout back. Computers did not have to be comprehensible by ordinary users That all changing with the advent of the personal computer (PC). To make PCs acceptable, the PC had to be made much more approachable.

People have been talking for some time about how the PC is changing from a tool used to create data into a system for information consumption. Computers are still used to create information in the form of documents, email, spreadsheets, and databases, for example. But the growth of the Internet has made the computer a window on the world from which information is either streamed to the user or a channel that is used to go out and look for it.

People speak about the computer as an "Information Portal". For many, the Internet has replaced newspapers, magazines, and TV as the place to go for news. That process will continue as information channels get better, as displays improve in quality, and electronic magazines and newspapers become as pleasant to read on screen as in paper.

However, in all this talk about the computer as an information portal, one important and fundamental fact has been neglected. Notwithstanding all of the advances in the user interface, it is not matched to the human perception system. The interface focuses all the information humans process into a channel that is far too narrow.

Instead of using all the attributes of human perception, i.e., foveal, parafoveal, peripheral vision, and 360-degree audio, information is being forced through the high-resolution (but narrow) foveal vision channel, which channel is now overloaded. Everything that takes place in foveal vision is a high-priority interrupt. Visual, precognitive triage is not possible. Attention must be given to all information that appears there.

Foveal vision is high-resolution vision that is used to focus on an object. The fovea is an area of the retina that is only about 0.2 mm across and has about 1.5 degrees of visual arc. The fovea facilitates foveal vision, which is an elliptical area just slightly less than an arms-length from the eyes. Objects are examined in this area, which is also the area used by humans to invent tools, to read, and to write.

The parafovea is the area of the retina immediately surrounding the fovea. This is a lower-resolution part of human vision whose major role appears to be to provide targeting information to determine the position of the next fixation, i.e., the length and direction of each successive saccade. Thus, the parafovea still plays a role in foveal vision, by targeting it effectively. Thought of in another way, it could be said that fovea and parafovea together make up a human high-resolution vision system. The resolution in the parafovea falls off gradually as the user moves farther away from the fovea.

The fovea/parafovea defines an ellipse that is approximately 12 inches high and 9 inches wide at a "normal reading distance" that ranges from about 2–22 inches.

The resolution of vision is highest in the fovea, then starts to drop off as the person moves further out in the parafovea. The drop is gradual at first, but accelerates dramatically, until out at the edges of the peripheral vision all that can be seen is movement.

Humans are incredibly sensitive to movement, especially at the periphery, using peripheral vision. Researchers have long reported that males and females use different strategies to navigate through the world. In broad terms, females use landmarks to navigate, while males tend to use broader bearings, such as direction of travel.

In two studies, it was found that a computer display with an ultra-wide field of view benefited both male and female users, and reduced the gender bias. Moreover, women took a wider field of view to achieve similar virtual environment navigation than men.

Without moving the head, humans can see about 208 degrees around in the periphery. Studies suggest how existing computer displays are biased towards male perception and fail to adequately use the peripheral vision. Thus, the 208-degree field of vision is not enough. To get full coverage, the person needs to be able to turn his or her head. To know when to turn the head, and to give coverage even when looking forward, sound is used.

Sound is a key piece of the human perception system. Sound processing provides additional coverage for those areas sight cannot cover. Sound covers all the areas outside vision up and towards the rear. It also allows humans to extend perception out beyond the range of vision, especially in areas where either growth or terrain create line-of-sight obstacles. Heretofore, sound in PC's has been used principally to create beeps. However, it has a lot more potential when analyzing the role it plays in the integrated perception of humans. There are some aspects of sound that should be considered as part of matching computer output to human perception input. Natural sound is "surround sound". Human perception has a "sound stage" that extends 360 degrees. Sound has direction, which indicates where to focus sight. For example, "You've Got Mail-Here!" means much more than "You've Got Mail!" Sound from behind the user, especially sharp sound, is a high-priority interrupt. Sound helps the user to extend perception into areas that cannot be seen. In the modem world, events on the other side of the globe can affect the way business is conducted.

When reading a book, conscious attention may be totally absorbed in the book. Peripheral vision, however, is still scanning its area of coverage for interrupts. If anything moves within the field of vision, the movement will trigger attention and distract the user from reading.

That is one reason pop-up ads on web pages are so annoying—because of the distraction aspect. It is also the main reason advertisers use them—to distract the viewer from other content, and to their message. Pop-ups are annoying because they appear in the area of focus, and not the periphery. In nature, when focusing on something, the object of focus stays more or less stable; the major interrupt signals of movement take place in the peripheral vision. In contrast, web pop-ups are presented in the focal plane.

The separation of human perception into focal plane, peripheral vision, and audio input is important in understanding how personal computers have degraded the human information triage system over the past couple of decades. The computer screen, placed more or less at reading distance from the eyes, is clearly a "focal plane" device. With current screen sizes, it pretty well has no input to the peripheral vision. Yet PCs have been used to dramatically increase the amount of data streaming at the viewer. In effect, the flow of data has increased to the human perception system, while reducing its bandwidth.

There is a need for increasing the bandwidth available for information triage in the human perception system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a method and system for matching digital information flow to the human perception system. In various embodiments, multi-monitor (multimon) support is leveraged to take advantage of multiple windowing and window positioning to separate elements of different tasks into information planes (which are based on a concept of "triage and focus"). Triage watches the flow of incoming information and determines the nature of the information. Based on the nature of the information and principles of human perception, Focus (or defocus) displays the information where the information is best viewed.

In support thereof, there is provided a system that matches digital information to a human perception system in accordance with the present invention. The system includes a triage component that watches the flow of incoming digital information and determines one or more characteristics of the information. Based on the characteristics of the digital information and principles of human perception in the form of human perception data, a viewing component focuses or defocuses the digital information on one or more displays such that the digital information is presented where it is best viewed. In various embodiments, multi-monitor ("multimon") support is leveraged to take advantage of multiple windowing and window positioning to separate elements of different tasks into information planes.

In another aspect thereof, a classifier automates aspects of the invention.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
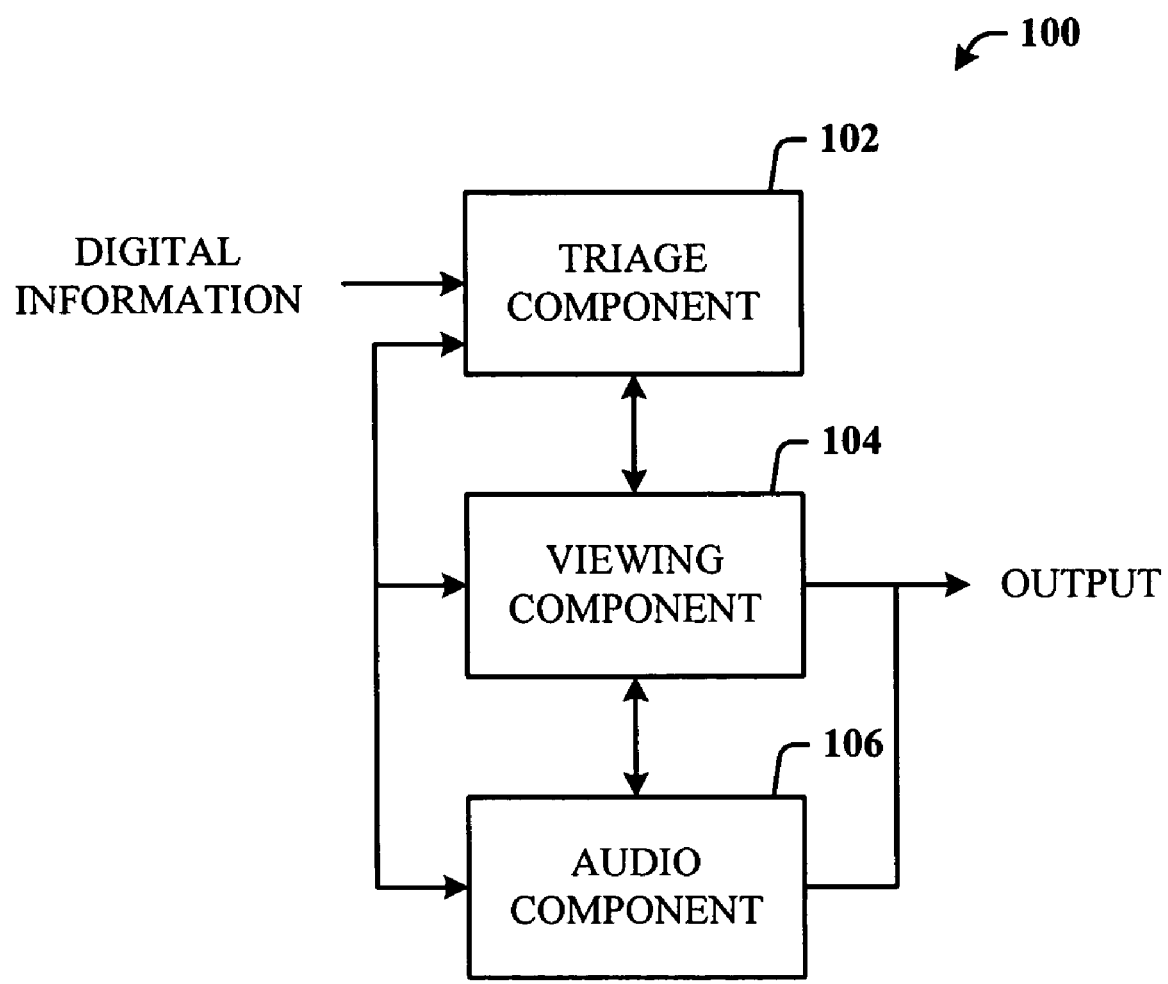
FIG. 1 illustrates a system that matches digital information to a human perception system in accordance with the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a system 100 that matches digital information to a human perception system in accordance with the present invention. The system 100 includes a triage component 102 that watches the flow of incoming digital information and determines one or more characteristics of the information. Based on the characteristics of the digital information and principles of human perception in the form of human perception data, a viewing component 104 focuses or defocuses the digital information on one or more displays such that the digital information is presented where it is best viewed. In various embodiments, multi-monitor ("multimon") support is leveraged to take advantage of multiple windowing and window positioning to separate elements of different tasks into information planes.

The system 100 includes an audio component 106 that facilitates the output of audio signals in the form of beeps, tones, music, and or voice signals, for example, to supplement presentation of the video information or as a separate output from the video information.

Figure 2:
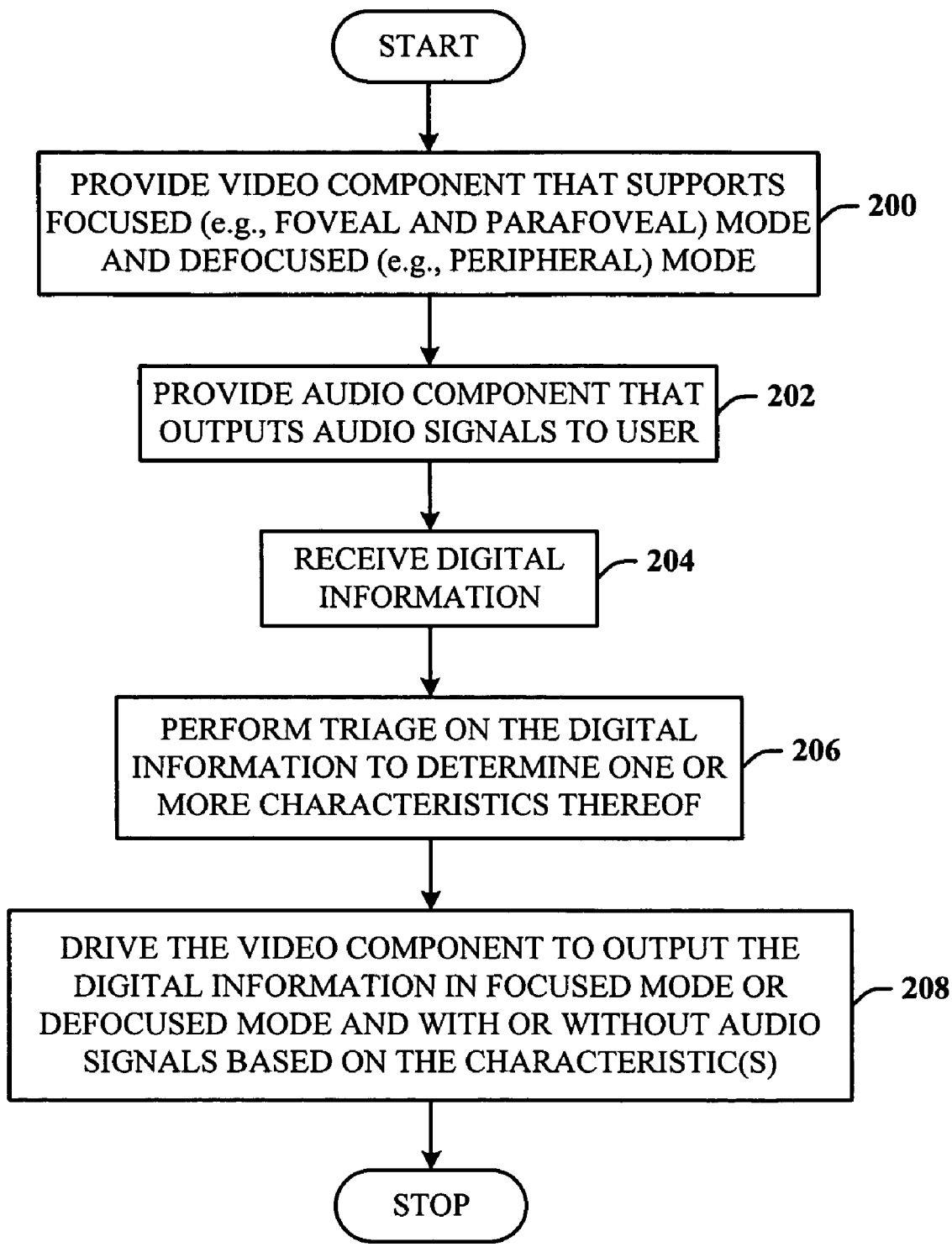
FIG. 2 illustrates a flow chart of one methodology for matching digital information flow to a human perception system in accordance with the present invention.

Referring now to FIG. 2, there is illustrated a flow chart of one methodology for matching digital information flow to a human perception system in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, a video system is provided that supports both a focused (e.g., foveal and parafoveal) mode and a defocused (e.g., peripheral) mode. Data like e-mail alerts, stock tickers, traffic data and so on, can be displayed in the peripheral area. Additionally, the peripheral area can be used as a place to keep things to find quickly and easily, and bring back into the focal area to work on them. However, size by itself is not enough. If a person intends to do any reading on either the peripheral or focused displays, then sufficient resolution is needed to be able to display the type well enough to meet full OSPREY (Optimized Serial Pattern Recognition) requirements. OSPREY is a description of the complex interactions between the human perception system and type when being read, and is described in detail in a document authored by William Hill, entitled "THE MAGIC OF READING", dated April 1999, the entirety of which is incorporated by reference. The resolution required for focused and defocused viewing is different. In one implementation for focused displays, a minimum resolution of around 150 ppi is provided. In another implementation of focused displays, 200 ppi is provided. Much lower resolutions can be used to drive the defocused displays (e.g., about 25 ppi)

At 202, an audio system is provided that outputs audio signals in response to the digital information and/or in response to system-generated events. It is to be appreciated that the audio system is an optional aspect of the present invention. At 204, the digital information is received. At 206, the triage component performs triage on the digital information to determine characteristics that indicate whether the information should be focused or defocused, for example. At 208, the video component is driven to present the digital information in either the focused or defocused mode based on the characteristics. The process then reaches a Stop block.

Figure 3:
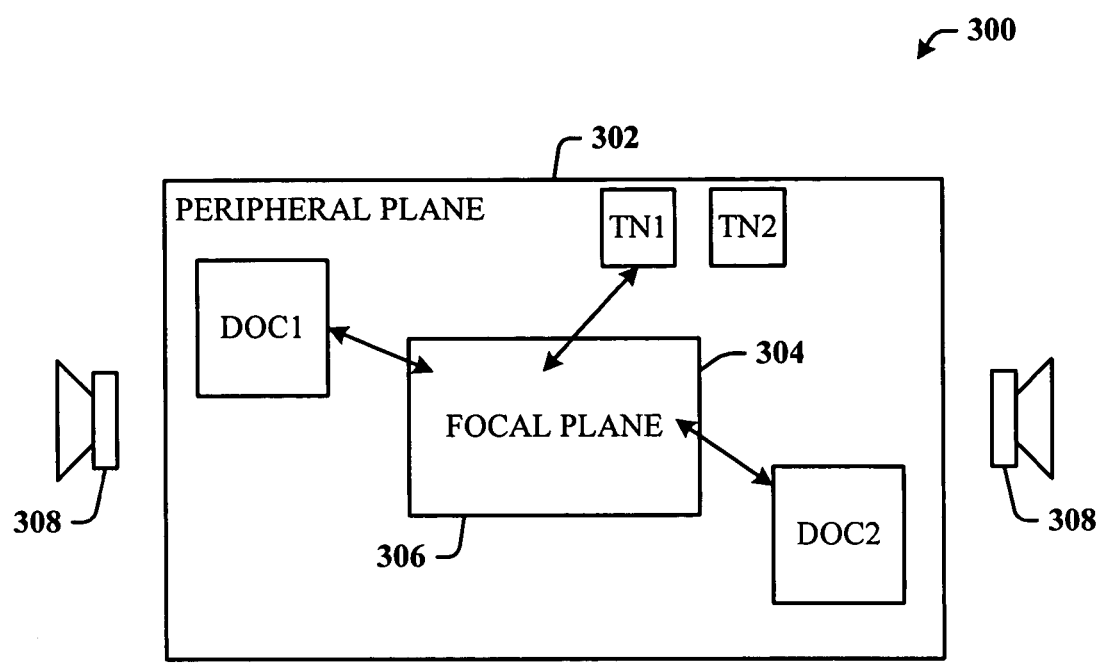
FIG. 3 illustrates a diagram of a viewing perspective having a peripheral (or defocused) background plane with a centered focal (or focused) foreground plane in accordance with the present invention.

Referring now to FIG. 3, there is illustrated a diagram of a viewing perspective 300 having a peripheral (or defocused) background plane 302 with a centered focal (or focused) foreground plane 304 in accordance with the present invention. Such a system can be accommodated using conventional multimon capabilities of computer and graphics adapter implementations. The peripheral plane 302 can be provided by a projection system driven by one graphics port (or adapter) that projects low resolution graphics of document images (e.g., DOC1 and DOC2) and thumbnail images (e.g., TN1 and TN2) outside the circumference of the focal plane 304, which matches perceiving of visual information outside the foveal/parafoveal (or in the periphery) of the human perception system. The thumbnails can be those of running applications. Thus, one click on a thumbnail opens the application instantly in full-screen on the focal-plane 304. In multimon, the wall display can be positioned directly above the focal plane 304.

The focal plane 304 can be accommodated by a monitor that presents visual information within the foveal/parafoveal range of the human viewer. Thus, there can be some lateral distance between the monitor of the focal plane 304 and the monitor of the peripheral plane 302.

The system 300 can also in the audio component, represented here by two speakers 308. It is to be appreciated, however, that the human perception system perceives audio best as a surround sound. Thus, the audio component is capable of providing surround sound for all output signals.

In order to minimize information overload, only objects of interest are presented in the focal plane 304. Thus, when the viewer desires to bring the DOC1 into the focal plane 304, he or she can simply drag and drop the DOC1 thereinto as provided by conventional multimon software and hardware capabilities. Similarly, when the view desires to move the DOC1 out of the focal plane 304, they simply drag-and-drop the DOC1 from the focal plane 304 into the peripheral plane 302.

Audio signals can be configured to accompany each operation as supplementary feedback to the viewer's perception system. Since the audio system can provide surround sound, it is to be appreciated that the audio signal can be spatially presented to indicate to the viewer that the document operation occurred in a certain direction. For example, when DOC1 was selected for movement from the peripheral plane 302 to the focal plane, from a leftward position form the perception of the viewer, a corresponding audio signal can be presented that is perceived to the front and to the left of the viewer, and perhaps, outputting a lower beep to higher beep that indicates movement of DOC1 from the defocused plane 302 to the focused plane 304. Conversely, when DOC1 is moved back to the peripheral plane 302 from the focal plane 304, an audio signal can be output that is perceived to the front and left of the viewer with a higher beep (focal plane) to a lower beep (defocused plane). Similarly, when operating on the thumbnail objects (e.g., TN1) viewer interaction can be accompanied by an audio signal that is perceived at front and to the upper right, whereas interaction with DOC2 will have an accompanying audio signal that is perceived to the front and lower right of the viewer.

Auto-resizing of the document or object can be provided as the viewer moves the DOC1, for example, between planes (302 and 304). Similarly, capability can be provided for the thumbnail objects. When the thumbnail TN1 is moved into the focal plane 304, it is automatically enlarged according to user parameters for viewing. Conversely, TN1 can be automatically reduced when moved back to the peripheral plane 302. Additionally, sounds can be designed that accompany the enlargement and/or reduction in size as the document or object is processed between the planes (302 and 304). Coloration and/or animation can also accompany the interaction in user-definable ways.

It is to be appreciated that user interaction can also be accompanied not only by audio signals, but also by animated graphics. Thus, selection of DOC1 can result in a flashing border about DOC1 or to make the whole DOC1 flash, for example. Color schemes can also be employed as user selectable options along with the audio signals for output when user interaction occurs with documents and objects.

It is further to be appreciated that where technical capability exists, a single monitor or display can be employed such that a higher resolution area (i.e., the focal plane) is driven at a higher resolution than the peripheral plane 302 which then is an annular region about the focal plane that is driven at a lower resolution, both of which match viewing by the human perception system.

This can also be facilitated by a windowing system that provides a higher resolution focal window in the foreground and a lower resolution peripheral window in the background for the peripheral plane 302.

Figure 4:
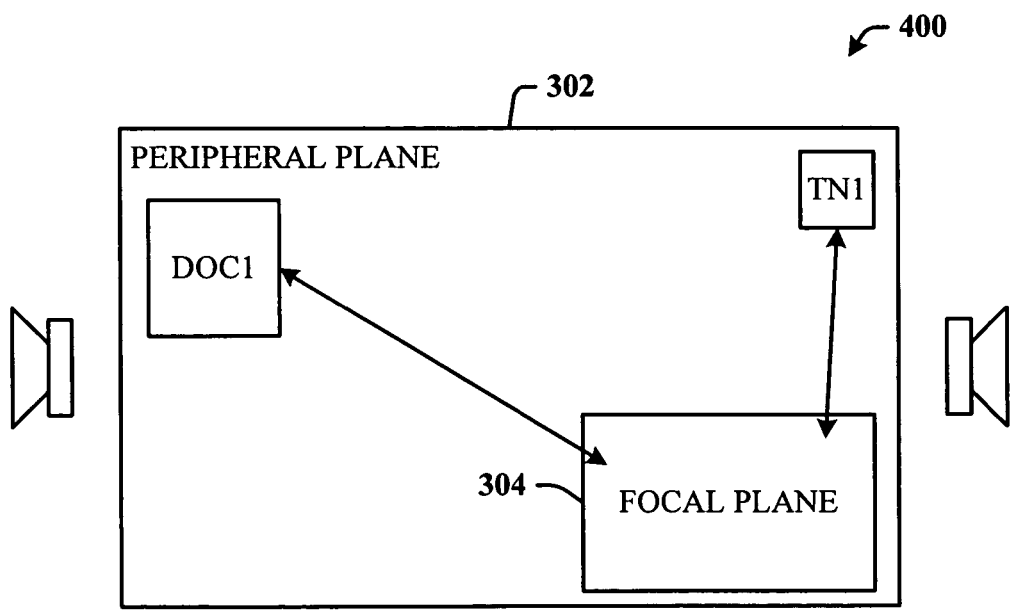
FIG. 4 illustrates a diagram of a viewing perspective having the peripheral (or defocused) background plane with the focal (or focused) foreground plane off-centered in relation to the peripheral plane, in accordance with the present invention.

Referring now to FIG. 4, there is illustrated a diagram of a viewing perspective 400 having the peripheral (or defocused) background plane 302 with the focal (or focused) foreground plane 304 off-centered in relation to the peripheral plane 302, in accordance with the present invention. Such a system can be accommodated using conventional multimon capabilities of computer and graphics adapter implementations. Here, the viewer can adjust the focal plane 304 to any location relative to the peripheral plane 302.

Other features and implementations described with respect to FIG. 3, apply to the system 400 of FIG. 4.

Figure 5:
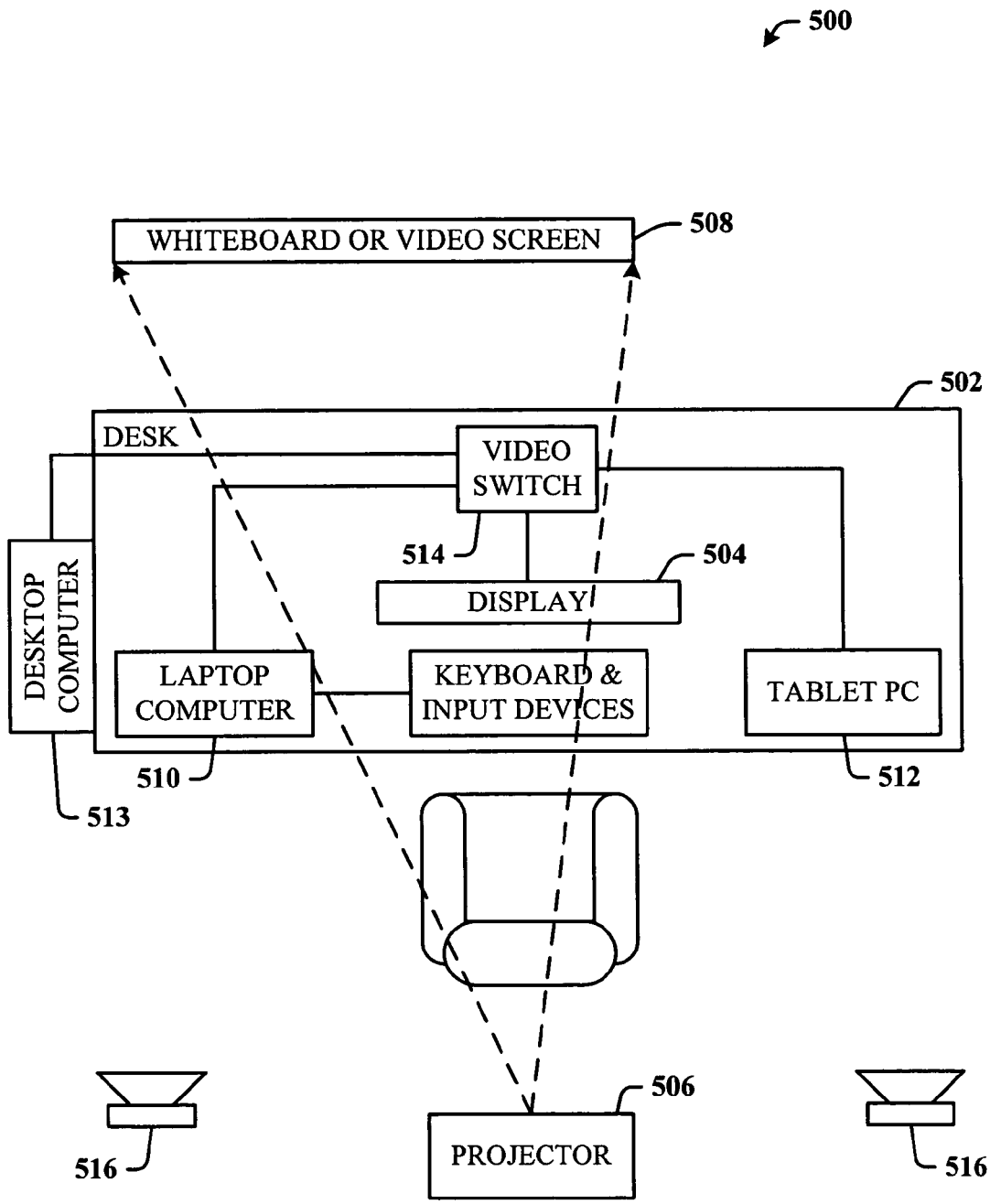
FIG. 5 illustrates an office layout of a system for matching digital information flow with the human perception system using a single wall in accordance with the present invention.

Referring now to FIG. 5, there is illustrated an office layout 500 of a system for matching digital information flow with the human perception system using a single wall in accordance with the present invention. In one embodiment, the viewer sits behind a desk on which is a display 504 that functions as the focal plane. The peripheral (or defocused) plane is provided by a projector system 506 that projects onto a whiteboard or a screen 508 positioned in front of the viewer (e.g., on a front wall) suitable for presenting documents and/or objects in accordance with human perception. The projector 506 can be a 1024×768 LCD projector that projects on the whiteboard, and sits on a bookshelf (not shown) or other platform of fixture above and behind the viewer. The projector 506 can be an NEC GT950 by NEC Electronics, Inc., that provides a keystoning capability to allow the image to be projected at normal whiteboard height with the projector mounted high on the bookshelf shelves thereby eliminating shadows caused by the viewer's head, for example.

The system 500 further includes a laptop computer 510, a tablet PC 512, and a desktop computer 513, all of which connect to a video switch 514 that switches video signals from any of the either computing devices (510, 512, or 513) to the focal display 504 or the peripheral projection on the whiteboard 508. A keyboard and/or other input devices 516 can connect to the laptop (and/or desktop) computer(s) to facilitate interaction therewith.

The computing devices (510, 512, and 513) can use multimon capabilities provided with conventional operating systems (e.g., WINDOWS XP-brand operating system by Microsoft Corporation) and graphics cards or the capability of the computing device (e.g., the portable computer 510) to drive its display (e.g., an LCD) and XGA signals out from the external monitor port to drive both the display 504 and projector system 506. The focused device can be an IBM T221 Flat Panel Display by IBM Corporation with 3840× 2400, 204 ppi as the primary focal-plane display 504. The focal display can be driven using a FireGL4 card by ATI Technologies, Inc., in an AGP (accelerated graphics port) slot of an IBM dual-processor tower system (not shown), which can also accommodate a second graphics card in a PCI (peripheral component interface) slot to drive the overhead projector.

The system 500 facilitates reading documents in a standard US Letter document format that is displayed with a two-page spread using, for example, WORD-brand word processor by Microsoft Corporation. The document pages are presented as actual size, and the text, at 204 ppi with ClearType is perceived as being readable as a paper document.

A second embodiment of the system 500 utilizes the same projector system 506 that is driven by an Inspiron 8500 laptop by Dell Corporation. The laptop includes a 2.4 GHz Pentium 4 processor, 1 Gb of RAM, and a built-in nVidia GeForce 4 graphics card by NVIDIA Corporation with 64 Mb of video RAM. The graphics card is sufficiently powerful to support full multimon in the operating system to get both the built-in 147 ppi (1920×1200) laptop screen and the 1024×768 projector output from the XGA socket.

A third embodiment utilizes uses a tablet PC 512 by Acer Corporation, and drives the projector system 506 from its standard graphics output port (e.g., XGA).

The display switch box 514 allows all three systems to run simultaneously, switching the output of each to the projector 506 as desired.

The system 500 also includes an audio system 516 that provides surround sound in accordance with many conventional surround sound systems, and in support of matching data flows to the human perception system requirements.

Figure 6:
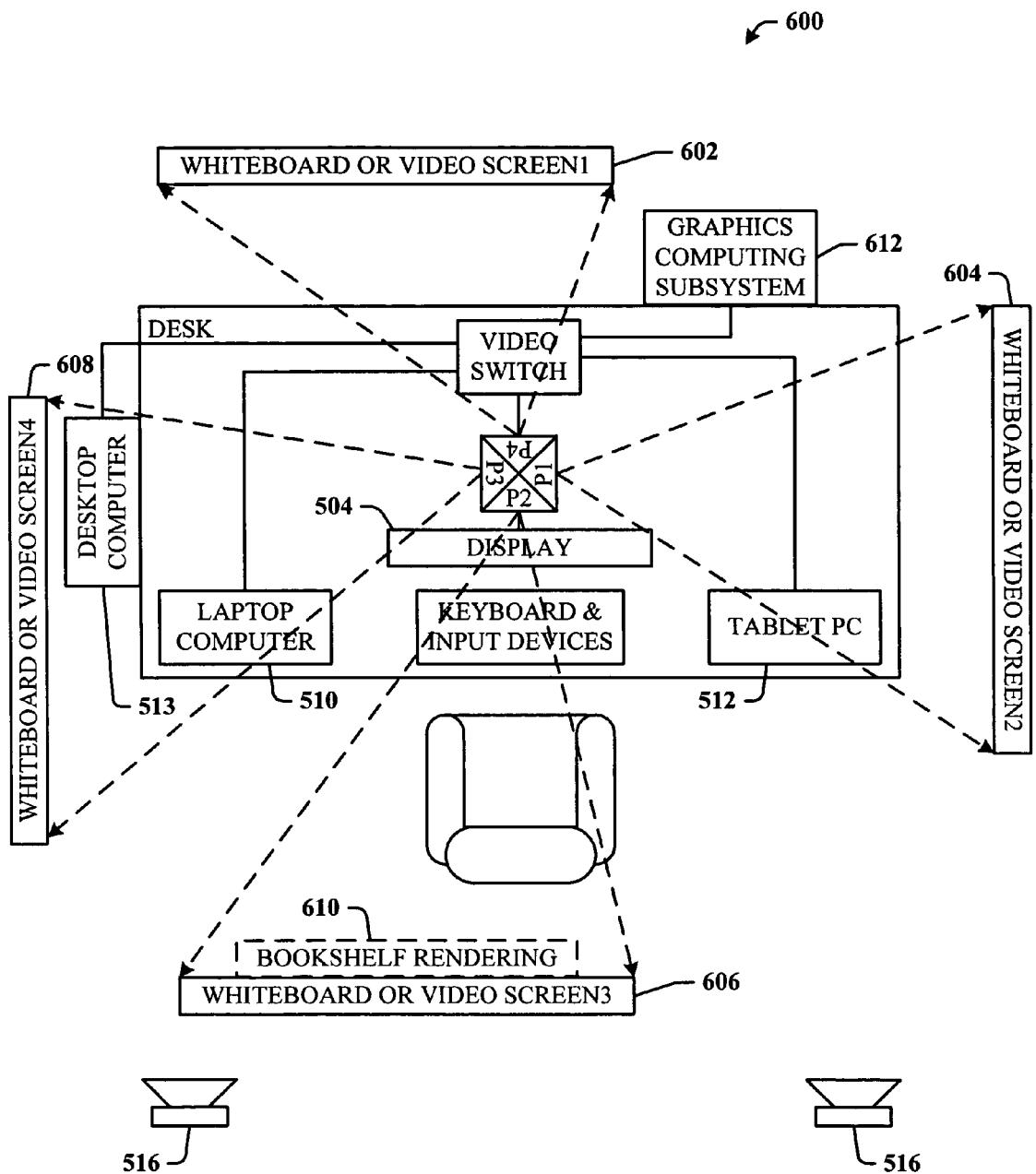
FIG. 6 illustrates an office layout of a system for matching digital information flow with the human perception system using multiple office walls in accordance with the present invention.

Referring now to FIG. 6, there is illustrated an office layout 600 of a system for matching digital information flow with the human perception system using multiple office walls in accordance with the present invention. In this implementation, multiple graphic adapters can be employed to drive the projector system 506 to present peripheral planes on multiple walls. For example, the front wall can have a first (or principal) defocused plane 602, on a second (or right) wall can be presented a second peripheral plane 604, on a third (or back) wall can be presented a third peripheral plane 606, and on a fourth (or left) wall can be presented a fourth peripheral plane 608. Such an implementation can be accommodated using a projection system that employs four channels (P1, P2, P3, and P4) of computer graphics information.

As before, the display 504 can be the focal plane display, but in this case, for all peripheral planes (602, 604, 606, and 608). Such an implementation places higher bandwidth requirements on the graphics and computing systems to drive all the displays (focused or defocused) with digital information, requiring suitable equipment to handle the implementation.

In this implementation, a virtual bookshelf 610 can be rendered on one of the peripheral planes (e.g., plane 606) such that the viewer can turn and select one of many books or documents displayed therein. Such book or document can then be moved to another computing device (e.g., the tablet PC) for rendering or reading in a portrait format in the focal plane display 504. It is to be appreciated that the laptop and tablet PC facilitate other focal plane devices, in addition to the display 504.

In support of the increased graphics processing capability required to drive the projector channels, a graphic processing subsystem 612 can be provided to handle the increased graphics processing requirements. The subsystem 612 connects to a switch 614 to receive, process, and forward the appropriate video signals from the computing devices (510, 512, and 513) to the projector channels (P1, P2, P3, and P4). The graphics subsystem 612 communicates with the operating systems of the computing devices (510, 512, and 513) to facilitate multimon functionality.

Figure 7:
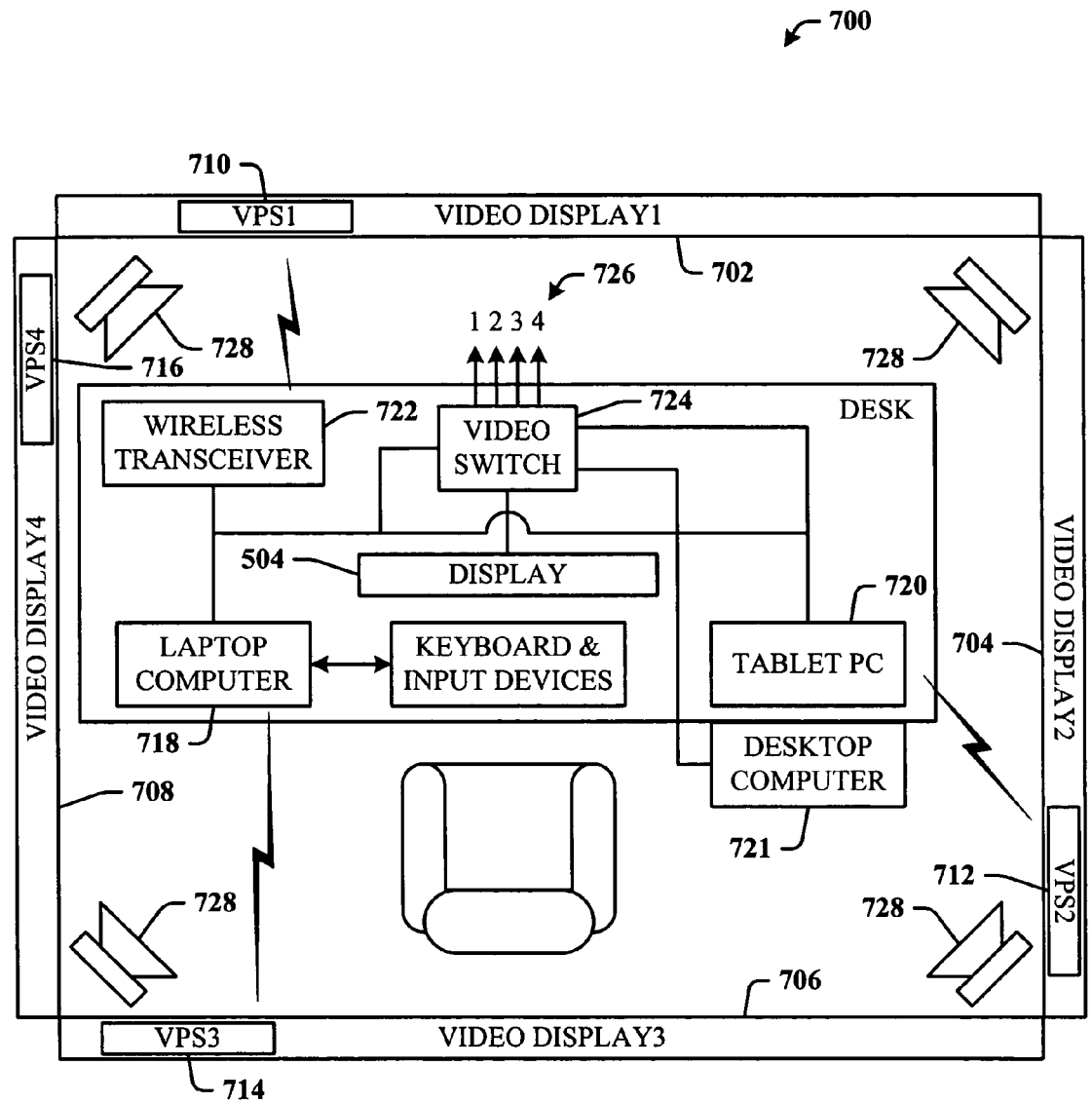
FIG. 7 illustrates an office layout of a system for matching digital information flow with the human perception system using multiple displays affixed or embedded into the office walls in accordance with the present invention.

Referring now to FIG. 7, there is illustrated an office layout 700 of a system for matching digital information flow with the human perception system using multiple displays affixed or embedded into the office walls in accordance with the present invention. Here, the walls are substantially covered with flat panel monitors (e.g., LCD or plasma) that are driven separately by one or more robust computing systems.

Such plentiful display surfaces afford a new approach to matching information flow to the human perceptive system. The user can have areas of semi-permanence where, for example, a picture could be "hung" of a high-resolution digital representation of the Mona Lisa. Moreover, such pictures can be rotated and manipulated in many different ways. As indicated hereinabove, the user can have a virtual "bookshelf" that appears like a real bookshelf with full-sized book spines. When the user chooses to read a book, he or she performs a drag-and-drop of the book as a pull-it-off-the-shelf operation, which loads the book onto the lightweight tablet PC for comfortable holding and reading.

Additionally, the user can have a "whiteboard" rendered on which the user can write using the tablet PC. Other users who visit the office can use their own tablet PCs to write in this shared area by connecting to the system either in a wired or wireless fashion.

The system allows the user to have areas for computing, and stores of space to efficiently use spatial memory to store data where it is always visible and can be found. The user can also keep "clusters" of applications and associated data in the same way, wherein the application and data are related to a "project" or "task."

However, the bandwidth requirements for transmitting such large amounts of video data in such a system can be prohibitive. Displays on such a scale require new graphics models. Conventionally, when driving a display, the graphics calculations are turned into pixel data close to the computer chassis via the computer CPU. This pixel data is then processed and passed across the wire to the display for presentation. In support of the disclosed display surfaces of FIG. 7, the sheer volume of pixel data in such ultra-large displays precludes this "traditional" solution. Moreover, the traditional solution even with today's displays implies bandwidth that stresses the capabilities of conventional wireless transmission. However, a whiteboard can be shared by processing and transmitting only small amounts of data from the CPU to the display. One enabling implementation is to process the graphics primitives close to the CPU, as performed conventionally, but the calculation of raw pixel data is performed close to or at the display, itself, (also called "just-in-time" (JIT) pixels). In essence, the GDI (graphics device interface) and/or associated electronics are integrated as a chip (e.g., an ASIC—Application Specific Integrated Circuit) operationally embedded in the display.

In one scenario involving the tablet PC, the pixel data is calculated only for its own portable display, and other linked large displays are driven by passing graphics primitives thereto for local pixel computation at the display. This enables the tablet PC to be the single repository of data and applications that allows the tablet PC to be taken anywhere and connected to a shared system, but would still enable linking to large displays when available without burdening the tablet PC with pixel calculations and the transmission thereof to the displays. Moreover, the reduced load afforded by JIT pixels facilitates wireless communications without the enormous bandwidths that normally would be required for such an implementation. The substantially reduced load associated with transmitting only graphics primitives to the display can be handled wirelessly.

Referring again to FIG. 7, the system 700 facilitates JIT pixels for large surface peripheral displays, a first peripheral display 702 (VIDEO DISPLAY1), a second peripheral display 704 (VIDEO DISPLAY2), a third peripheral display 706 (VIDEO DISPLAY3), and a fourth peripheral display 708 (VIDEO DISPLAY4). Each display (702, 704, 706, and 708) includes onboard video processing subsystem (VPS) to process pixel calculation local to the display. Thus, the first display 702 includes a first VPS1 710, the second display 704 includes a second VPS2 712, the third display 706 includes a third VPS3 714, and the fourth display 708 includes a fourth VPS4 716.

Each of a laptop computer 718, tablet PC 720, and desktop computer 721 can facilitate the focal plane device, as well as the display 504. Moreover, since JIT pixels technology is employed, each of the computing devices (718, 720, and 721, which are similar to respective computing devices 510, 512, and 513) can communicate video signals wirelessly to any or all of the displays (702, 704, 706, and 708), either directly or through a wireless transceiver 722. Communications can also be by wired means such as through a video switch 724 having four outputs 726 (shown not connected) to the four different displays (702, 704, 706, and 708).

The video system support matching data flow to the human perception system. Additionally, a surround sound audio system, indicated by the four speakers 728 provides directional audio that facilitates matching audio signals to the human perception system.

Figure 8:
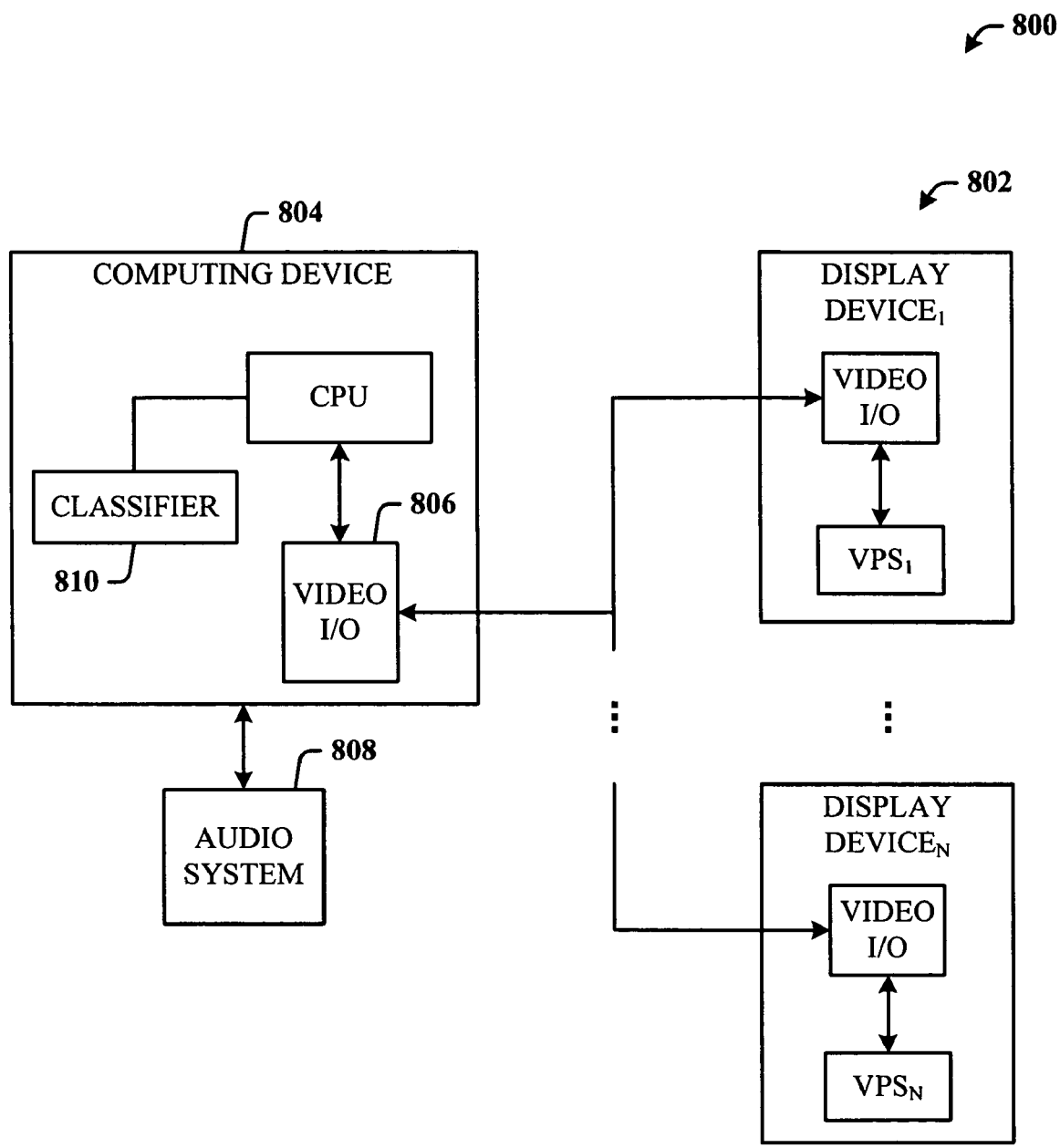
FIG. 8 illustrates a block diagram of JIT pixels system 800 that drives multiple displays, and employs a classifier in accordance with the present invention.

Referring now to FIG. 8, there is illustrated a block diagram of JIT pixels system 800 that drives multiple displays, and employs a classifier in accordance with the present invention. Each of N displays 802 (denoted DISPLAY DEVICE$_1$, . . . , DISPLAY DEVICE$_N$) includes the respective VPS$_1$, . . . , VPSN$_N$. It is to be appreciated that a separate internal VPS need not be employed with each display 802, rather an external VPS unit can be employed that supports two displays. Other such multi-support implementations can be employed with suitable high bandwidth connections.

A computing device 804 can drive each of the displays through a video I/O (input/output) block 806. Each of the displays 802 includes a display video I/O block that connects to the computer video I/O block 806 to receive raw graphics data for local processing and rendering by the respective local VPS. With JIT pixels technology, the connection to the computing device 804 can now be wired or wireless.

The system 800 also includes an audio system 808 for providing audio signals alone or in combination with the video signals to facilitate the matching of data information flow to the human perception system in accordance with the present invention.

In this particular embodiment, the system 800 can employ a classifier 810. The subject invention can employ various artificial intelligence based schemes for carrying out various aspects thereof. For example, a process for determining what documents or objects to display in the focal plane versus the peripheral plane can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining according to a predetermined criteria, the following: based on document content, when and where to move a document or object from plane or plane; based on the document type, when and where to move a document or object from plane or plane; based on the number of peripheral displays, where to move a document or object; based on the user and historical information of the user, where to move a document of object; based on the application, where to move the application data in the peripheral plane; based on version and/or timestamp of the document, where to place the document in the peripheral plane; and based on audio input signals, where to move the document in the peripheral plane or between the focal and peripheral planes. Thus, it can be appreciated that there are numerous features and operations that can be learned and therefore, automated, when using the classifier 810.

Other learned and thereafter, automated operations, can be based on coloration and/or animation, and the use of audio signals to further match data flow with the human perception system. Different colors can be used on side displays versus front and back display, etc. Audio signals can be used more heavily on side and back displays that front display to interrupt the human system to information on these displays. Given that the system would "know" the orientation of the displays, the system can then learn and automate operations accordingly.

Figure 9:
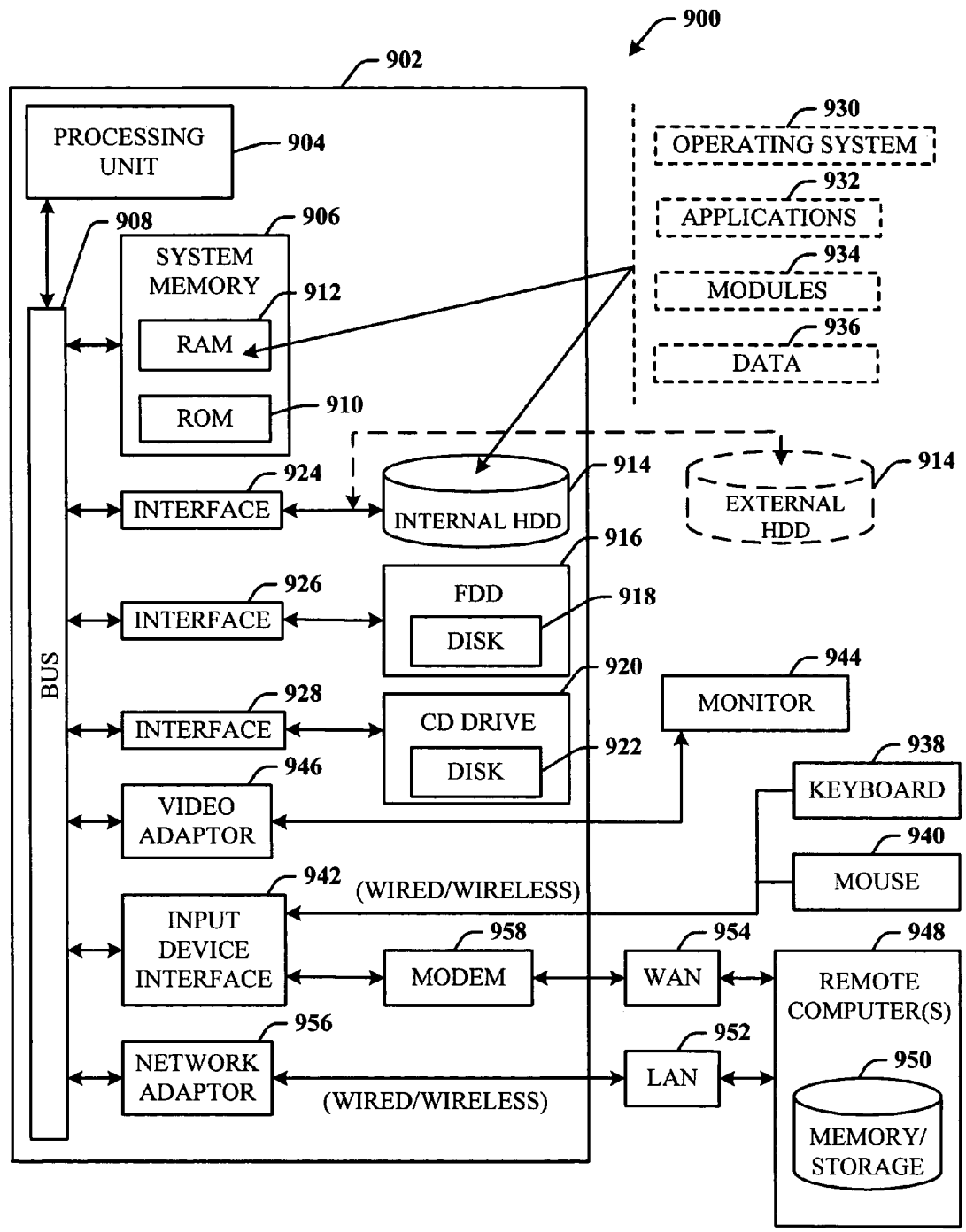
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the present invention, FIG. 9 and the following discussion are intended to provide a brief, general description of a suitable computing environment 900 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multiprocessor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 912, including an operating system 930, one or more application programs 932, other program modules 934 and program data 936. All or portions of the operating system, applications, modules, and/or data can also be cached in the RAM 912.

It is appreciated that the present invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956. When used in a WAN networking environment, the computer 902 can include a modem 958, or is connected to a communications server on the LAN, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 10:
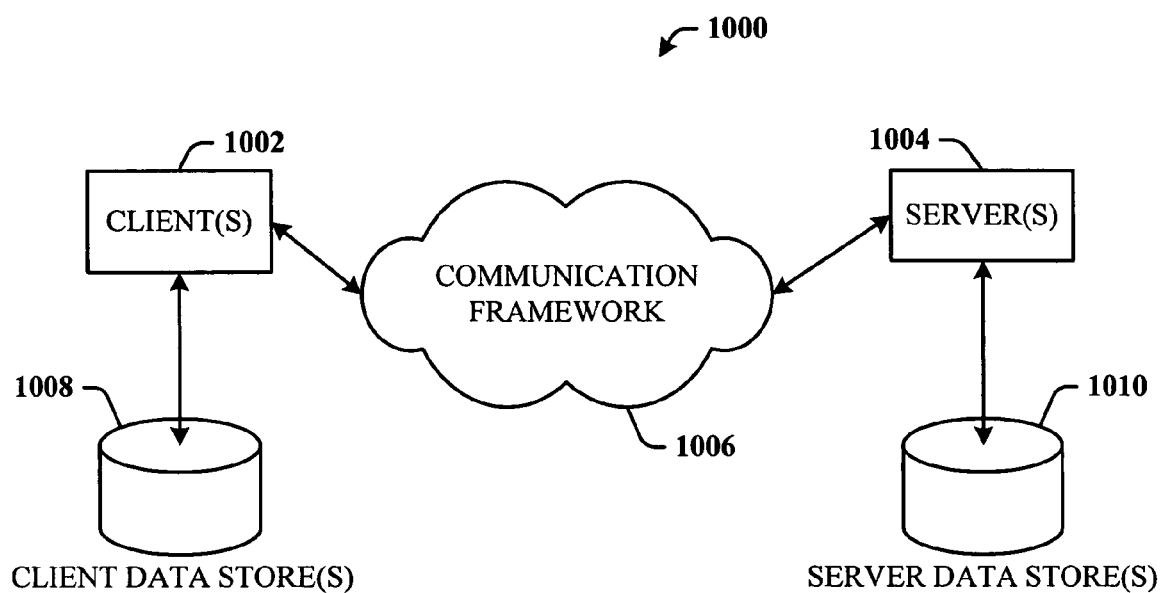
FIG. 10 illustrates a schematic block diagram of an exemplary computing environment in accordance with the present invention.

Referring now to FIG. 10, there is illustrated a schematic block diagram of an exemplary computing environment 1000 in accordance with the present invention. The system 1000 includes one or more client(s) 1002. The client(s) 1002 can be hardware and/or software (e.g., threads, processes, computing devices). The client(s) 1002 can house cookie(s) and/or associated contextual information by employing the present invention, for example. The system 1000 also includes one or more server(s) 1004. The server(s) 1004 can also be hardware and/or software (e.g., threads, processes, computing devices). The servers 1004 can house threads to perform transformations by employing the present invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates matching of digital information to the human perception system, comprising:
    a triage component that determines a characteristic of the digital information; and
    a viewing component that presents the digital information according to the characteristic thereof, the viewing component presents the digital information in a focused mode on a first computing device and a peripheral mode on a second computing device, the first computing device is a tablet personal computer.

2. The system of claim 1, the viewing component presents the digital information in at least one of a focused mode and a peripheral mode.

3. The system of claim 1, the digital information is presented in different viewing planes.

4. The system of claim 1, the digital information is presented in different viewing resolutions.

5. The system of claim 1, the triage component determines the characteristic based on human perception data.

6. The system of claim 1, further comprising an audio component that presents audio information according to the characteristic.

7. The system of claim 1, the digital information is delivered to the viewing component according to just-in-time video data transfer.

8. A computer that employs the system of claim 1.

9. A system that facilitates matching of digital information to human perception system, comprising:
    a triage component that determines a characteristic of the digital information and processes the characteristic in accordance with human perception data;
    a viewing component that presents the digital information in at least one of a focused mode and a defocused mode according to the characteristic thereof, the viewing component presents the digital information in a focused mode on a first computing device and a peripheral mode on a second computing device, the first computing device is a tablet personal computer; and
    an audio component that outputs audio information according to the characteristic.

10. The system of claim 9, the digital information is presented in different viewing planes and at different viewing resolutions.

11. The system of claim 9, the digital information is delivered to the viewing component according to just-in-time video data transfer.

12. The system of claim 9, further comprising a classifier that employs a probabilistic and/or statistical-based analysis to prognose or infer an action that a user desires to be automatically performed.

13. A computer-readable medium having computer-executable instructions for performing a method of matching digital information to a human perception system, comprising:
    determining a characteristic of the digital information; and
    presenting the digital information according to a characteristic thereof to match the human perception information, the digital information is presented in a focused mode on a first computing device and a peripheral mode on a second computing device, the first computing device is a tablet personal computer.

14. The method of claim 13, further comprising presenting the digital information in at least one of a focused mode and a peripheral mode.

15. The method of claim 13, the digital information is presented in different viewing planes.

16. The method of claim 13, further comprising presenting the digital information at different viewing resolutions.

17. The method of claim 13, further comprising determining the characteristic based on human perception data.

18. The method of claim 13, further comprising a classifier that employs a probabilistic and/or statistical-based analysis to prognose or infer an action that a user desires to be automatically performed.

19. The method of claim 13, further comprising presenting a peripheral plane according to a plurality of display devices.

20. The method of claim 19, further comprising presenting audio information according to the characteristic.

21. The method of claim 19, further comprising delivering the digital information according to just-in-time video data transfer.

22. The method of claim 19, the peripheral plane is communicated wirelessly.

23. The method of claim 13, further comprising processing graphics data local to a peripheral display.

24. The method of claim 13, further comprising processing audio signals at least one of separate from video signals and in combination with the video signals.

25. A method of matching digital information to a human perception system, comprising:

determining a characteristic of the digital information; and presenting the digital information in at least one of a focused mode and a peripheral mode according to a characteristic thereof to match the human perception system, the digital information is presented in a focused mode on a first computing device and a peripheral mode on a second computing device, the first computing device is a tablet personal computer.

26. The method of claim 25, further comprising presenting the digital information in a single plane that facilitates both the focused mode and the peripheral mode.

27. The method of claim 25, further comprising presenting peripheral information of the peripheral in multiple peripheral planes positioned about a computing device that drives the peripheral planes.

28. The method of claim 25, the focused mode is presented on a laptop computer.

29. The method of claim 25, further comprising providing a virtual bookshelf that facilitates reading a virtual book.

30. The method of claim 25, further comprising providing just-in-time pixels according to multiple peripheral planes positioned around a room.

31. The method of claim 25, further comprising providing an audio signal in response to moving a document or object between a focal plane and a peripheral plane.

* * * * *